United States Patent [19]

Nikolaus et al.

[11] Patent Number: 5,128,599
[45] Date of Patent: Jul. 7, 1992

[54] AUTOMATIC CONTROL SYSTEM

[75] Inventors: Heinrich Nikolaus, Hamburg; Gerhard Ditter, Lohr/Main, both of Fed. Rep. of Germany

[73] Assignee: Mannesmann Rexroth GmbH, Lohr/Main, Fed. Rep. of Germany

[21] Appl. No.: 588,009

[22] Filed: Sep. 25, 1990

[30] Foreign Application Priority Data

Sep. 25, 1989 [DE] Fed. Rep. of Germany ....... 3931964

[51] Int. Cl.$^5$ .......................................... H02K 29/04
[52] U.S. Cl. .................................. 318/685; 318/663; 123/352; 364/426.03
[58] Field of Search ................ 318/561, 567, 568.14, 318/568.2, 601, 663, 671; 137/625.63; 91/361; 364/424.1, 426.02; 123/432, 589; 303/95, 96, 97, 100, 103; 188/181 C

[56] References Cited

U.S. PATENT DOCUMENTS

| | | |
|---|---|---|
| 3,587,872 | 6/1971 | Pauly . |
| 3,760,251 | 9/1973 | Posl et al. ............................ 318/601 |
| 4,484,294 | 11/1984 | Noss ................................ 318/568.14 |
| 4,513,782 | 4/1985 | Contratese et al. ............ 137/625.63 |
| 4,629,954 | 12/1986 | Banzai et al. ........................ 318/561 |
| 4,901,625 | 2/1990 | Bussan et al. ........................ 91/361 |

FOREIGN PATENT DOCUMENTS

| | | |
|---|---|---|
| 2660912 | 5/1977 | Fed. Rep. of Germany . |
| 2622906 | 4/1981 | Fed. Rep. of Germany . |
| 3322220 | 1/1984 | Fed. Rep. of Germany . |
| 3623651 | 1/1988 | Fed. Rep. of Germany . |
| 3724428 | 2/1989 | Fed. Rep. of Germany . |
| 2124407 | 2/1984 | United Kingdom . |
| 2188720 | 10/1987 | United Kingdom . |

*Primary Examiner*—Paul Ip
*Attorney, Agent, or Firm*—Harness, Dickey & Pierce

[57] ABSTRACT

An automatic control including a memory is provided to be loaded with positional data for the automatic control of a cycle of motions of preferably a plurality of power members. The speed reading the data in and out is freely selectable. Accordingly programming a cycle of motions may be performed in a slow motion process, whereas the speed of reading out the data is selected such that an optimum operational speed is obtained. In addition to the automatic speed control a manual control is provided to interrupt the cycle motion of the automatic control to manually adjust the position or the power member. In returning to the automatic control the further cycle of motion is taken up again where it has been interrupted.

11 Claims, 1 Drawing Sheet

AUTOMATIC CONTROL SYSTEM

BACKGROUND OF THE INVENTION

The present invention relates to an automatic control system for controlling the motions of at least a power member controlled by a servo device. The present invention more particularly relates to a control system for controlling a plurality of hydraulic power units to be simultaneously actuated to perform a cycle of motions.

Remote control devices to actuate a power member, for example a hydraulic cylinder are used principally to control the working direction, the speed and the power of the cylinder, and the remote control device is connected via an electrical control circuit to a proportional solenoid valve. In response to a manual adjusting position of the remote control device the control circuit generates a current for the solenoid of the valve such that the power cylinder is actuated by the solenoid valve. To automatically control a predetermined cycle of motion of the cylinder the artisan is aware of prior art learning systems according to which signals corresponding to successive positions of the cylinder are read-out from a memory. For loading the memory the positions corresponding to desired motions of the cylinder governed by a point setter or transmitter are measured and stored in the memory.

In programming a desired pattern or cycle of motions problems primarily arise when the motions of a number of drive units must be coordinated to each other which means that the control is performed simultaneously in a number of axes. This is the case, for example, when multi-armed robots are automatically controlled, or, when excavators have to perform a predetermined pattern of excavating motions. The control of all the single valves controlling the power units is performed by a multiple axis potentiometer called joy-stick. Since a number of valves must be controlled by pivoting the joy-stick of the transmitter in a number of directions, the operating person encounters problems to find the desired cycle of motions free of error to be read-in the memory while actuating the joy-stick.

The aim of the present invention is to load the data determining a cycle of motions of at least a power unit in a memory such that each desired successive motion is simply and safely loaded in the memory while making possible corrections of any errors. In particular the aim of the present invention is to ensure that the reading-in and reading-out of data may be stopped to perform corrections or, respectively to modify the cycle of motions via a transmitter.

SUMMARY OF THE INVENTION

According to the present invention an automatic control system for controlling a cycle of motions of at least a power member controlled by a servo device, in particular for a plurality of hydraulic power units to be simultaneously actuated, comprises a transmitter means for setting desired motional values, a control circuit for actuating said servo device, a loop for feeding back positional data defining said cycle of positions of the power member in operation and a memory for reading-in and out said positional data which define said cycle of positions, wherein a memory each is correlated to each power member, wherein said data defining said position successive in time and corresponding to said cycle of motions are read-in identical memory locations in each single memory and wherein the reading-in and reading-out speed of the positional data is freely selectable.

Accordingly the timing intervals for loading the memory locations with the positional data of the power member can be freely selected. This means that the person handling the joy-stick has enough time to find out on each particular position while a number of power units is in operation, whereupon the data determining said position are held on and loaded in the memory and only then the next following memory locations can be addressed. The loading time is freely selectable so that the time may be extended to perform a slow motion. Preferably the time interval is terminated after a particular position has been found. Furthermore the memory may be operated in a reverse run to erase data already read-in which are to be replaced by new data.

Still further the interval time for switching from one location to the other is freely selectable when reading-out the positional data from the memory in the automatic control operation so that the speed of the motions may be accelerated, decelerated or may be inverse. In accordance therewith the present invention relates to an automatic control which allows to freely select the time intervals for reading-in and out the positional data. In particular it is a substantial advantage to have a time period available as long as possible when reading-in complex cycles of motion, whereas reading-out the data is performed in a predetermined working speed.

According to a further aspect of the present invention the setpoint transmitter is adapted to superimpose certain setpoints for a modified cycle of motions to the data read-out from the memory. In accordance therewith the switching time or time interval to switch over to the next following memory location is extended to be infinite such that the memory continuously transmits data from each of the preceding memory locations and these data are superimposed with desired data delivered by the setpoint transmitter. Accordingly a modified motion of the power member is initiated and performed. As soon as this motion is terminated the automatic cycle of motions is continued there where it was interrupted. It is of course possible to continue further reading-out the positional data from the memory, but to superimpose other correction values determined by adjusting the transmitter.

BRIEF DESCRIPTION OF THE DRAWINGS

Other advantages and features of the invention will appear from the following description of a non-limiting embodiment with reference to the figures which show.

DESCRIPTION OF THE PREFERRED EMBODIMENT

Figure 1:
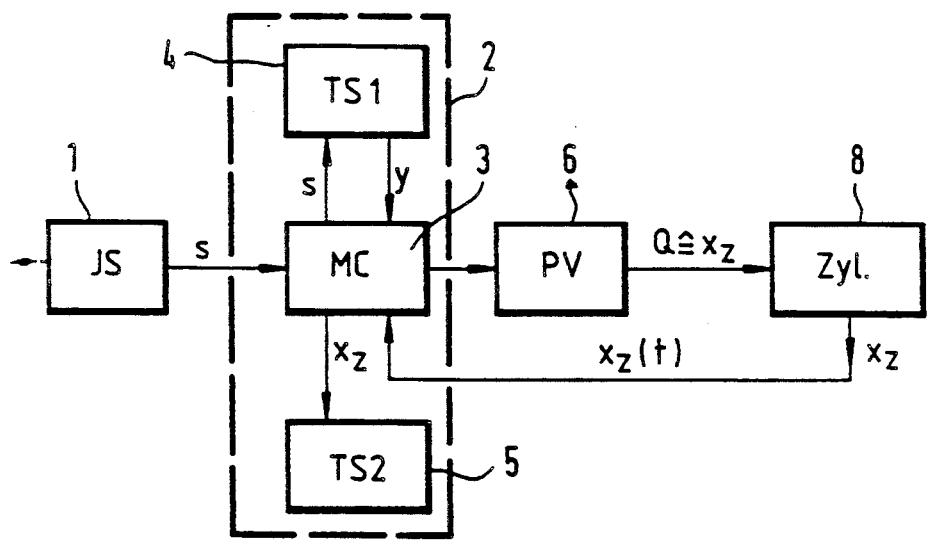
FIG. 1 is a simplified diagram of a circuit for loading positional data of a hydraulic cylinder, FIG. 2 a schematic illustration of a memory device and FIG. 3 a simplified diagram of a circuit for reading-out positional data to operate a cylinder.

FIG. 1 shows a control transmitter 1 connected to a control circuit 2 including a microprocessor 3, a read-in memory 4 and a random memory 5. The output terminals of the control circuit are connected to a proportional solenoid valve 6 for controlling a hydraulic cylinder 8. The piston rod of the cylinder 8 actuates a stroke transducer not shown. Furthermore, analog digital as well as digital analoge converters are not shown.

The response curve of the solenoid valve 6 is stored in the memory 4. To this end the response curve of the valve 6 is measured and the pairwise determined values for the stroke and the correlated current are read-in the memory 4. This is performed through the microcontroller 3 which receives a stroke signal determining the position of the valve piston via a stroke transducer 1 as well as the correlated current i delivered to the coil of the solenoid valve 6. Both magnitudes, the stroke and the current magnitude are digitized and read-in the memory 4. To store the data in the memory 4 the current defines the input magnitude to the valve 6 and the stroke defines the output magnitude. However, to operate the valve thereafter the setpoint magnitude s for a stroke is fed via the microprocessor 3 to the memory 4 to address a location in the memory and to read-out the correlated current magnitude y as an output magnitude defining the controlled current to the valve 6. In this manner a linear response curve of the valve 6 is generated. Using the memory 4 in the control circuit 2 illustrated is optional.

A further memory 5 is provided to store the data representing a cycle of motions of the cylinder 8. The cycle of motion is determined by the control transmitter 1. The control transmitter 1 delivers setting magnitudes s to the microprocessor 3 which operates to read-out the correlated current magnitude y from the memory 4 to deliver this current magnitude to the solenoid valve 6 which sets a flow of volume Q to actuate the cylinder 8. While actuating the transmitter 1 the successive positions of the cylinder 8 are measured by the transducer not shown. These actual magnitudes $x_z$ defining the positions are fed back to the microprocessor 3 and these magnitudes in their successive time intervals define the cycle of motion of the cylinder 8. The data $x_z$ for the positions are fed in the memory 5.

FIG. 1 shows an embodiment for a single power unit 8. It should be understood that the system may be enlarged for a plurality of power units, each power unit to be actuated by a separate solenoid valve. Loading the setting magnitudes is then performed by using a multiple axis potentiometer transmitter.

Figure 2:
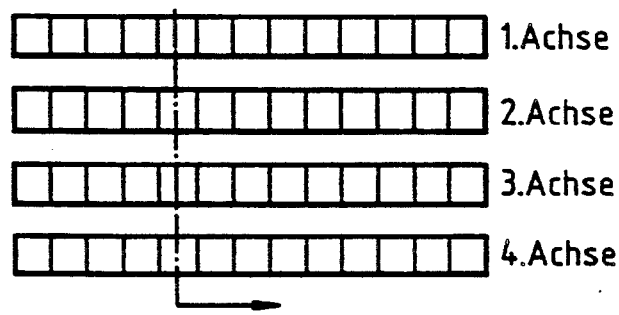

A memory arrangement for loading data of a number of 4 power units is shown in FIG. 2. The successive run of positions for each single power unit is loaded in a correlated memory. Loading the positional data $x_z$ is performed in accordance with a clock frequency determined by the microprocessor. The data of the separate power units each are read-in the very same locations of each memory. Switching from one location to the next following location in the memory can be programmed by a data pointer DPTR which is known to the artisan. The DPTR-signal allows to freely select the switching time. The DPTR signal contains a number defining a predetermined memory location, while the time change of the signal (switching time) defines the transfer to the next following memory location (number). This means that the switching time may be extended to be infinite allowing infinite time to find out a desired position of all power units, while it is possible to correct the positions at the transmitter. To load the positional data corresponding to the desired positioning into the memory the data point signal is used to switch to the next following row of memory locations. In this row the positional data are stored for the corresponding positions of the power units. In decreasing the switching time adjusted by the DPTR signal the switching to the next following row of memory locations is performed automatically and the data determined by actuating the control transmitter are loaded in the memory in a cycle which is defined by the switching time. Accordingly loading the positional data may be continuously adjusted in time. By reversing the DPTR signal the reading-in operation may be reversed so that preceding memory locations are erased and new data are read-in for correction. The DPTR signal is selected by actuating a pedal.

Figure 3:
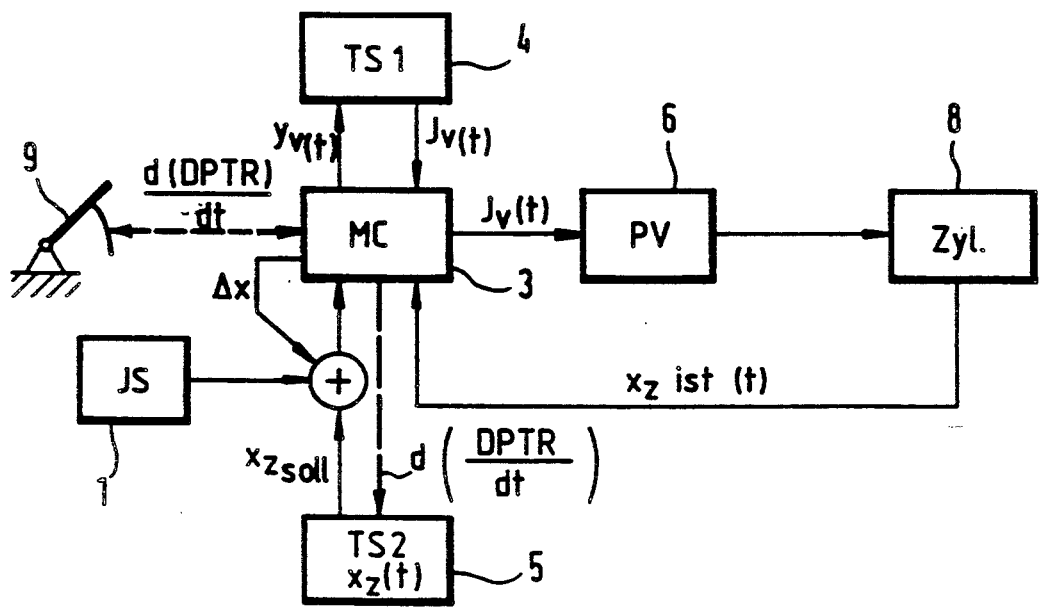

FIG. 3 shows using the data stored for automatically controlly the cylinder 8. Similar components are identified by the same reference numerals used in FIG. 1. The speed of reading-out the data from the memory 5 is determined by a pedal 9 to select a DPTR signal which is delivered to the microprocessor 3 to select the switching interval timed for changing the memory locations. The positional data $x_z$ are delivered from the memory 5 to the microprocessor 3 which delivers a corresponding desired magnitude $y_v$ to the memory 4 containing the response curve of the valve in order to readout a current magnitude $I_v$ from the corresponding address. The valve 6 is thus actuated and a motion of the cylinder 8 results which is measured by a position transducer not shown which actual value $x_z$ is delivered to the microprocessor 3 in which the actual magnitude is compared with the desired magnitude $x_z$ read-out from the memory 5 to define an error signal which is delivered to the valve 6 to actuate the cylinder 8 until the desired and the actual magnitude are balanced. The DPTR signal allows to adjust the speed of reading-out the data from the memory and thus to determine the operational speed of the cylinder.

Accordingly the data input and output may be performed using a different and selectable speed. For reading-in a slow motion process is preferred in most cases, whereas reading-out is performed in a quick motion process.

In addition a manual control is superimposed. When the transmitter 1 and the pedal 9 are actuated so that the switching time is switched to be infinite any further reading-out of data from the memory locations is stopped, wherein the last delivered magnitudes continuously appear on the output line. This magnitude is superimposed with a desired magnitude adjusted at the transmitter 1 and then delivered to the microprocessor 3, such that the cylinder 8 is actuated as specified before. While the automatic control performs the memorized cycle of cylinder motions with a predetermined speed, the transmitter 1 allows to adjust the position of the cylinder 8. When the transmitter 1 is returned again further reading-out data from the memory 5 is initiated again due to the DPTR signal and the motion of the cylinder 8 is continued from the position in which it was stopped before. For example this is of particular advantage for an excavator when the automatic control is to be interrupted for a short time in order to perform some other operation which shall be manually controlled.

As long as the transmitter 1 is actuated the program is continued but may be corrected by the transmitter.

In a hydraulic system comprising a variable displacement pump and a number of power units it is assumed that the displacement volume of the pump is too small to obtain a higher speed of a power cylinder even in the fully opened position of the directional valve. According to the invention the DPTR signal may be used to slow down the reading-out of the positional data from the memory. The DPTR signal is superimposed with a limiting signal which is generated in the hydraulic system. For example the limiting signal may be generated by the pump displacement adjusting cylinder when the pump operates at maximum. Further the limiting signal may be generated in response to the maximum possible stroke of the solenoid valves or in response to the power requirement of a motor driving the pump.

Furthermore controlling the servo device may be improved by generating a difference signal x between the actual magnitude of the position of the power unit and the corresponding desired magnitude from the memory which difference signal is delivered to an adding stage between the memory 5 and the microprocessor 3 to add the difference signal x to the desired magnitude read-out from the memory. Accordingly the error signal to be delivered to the servo device 6 may be corrected towards zero. A further application may be provided for the DPTR signal when this signal is used as an adjusting signal for a closed control loop.

What is claimed is:

1. An automatic control system for controlling a cycle of motions of t least a power member controlled by a servo device, in particular for a plurality of hydraulic power units to be simultaneously actuated, comprising a control transmitter for setting desired motional values, a control circuit for actuating said servo device, a loop for feeding back positional data defining a sequence of positions of the power member in operation, and a memory including at least one random memory for reading-in and out said positional data which define said cycle of motions, characterized in that a random memory each is correlated to each power member, that the data defining said positions successive in time and corresponding in time to said cycle of motions are read-in identical memory location in each random memory and that the speed of reading-in and out said positional data is freely selectable by a time selecting DPTR signal controlled by a pedal such that the switching time between the memory locations in each random memory is modified by the DPTR signal, and when the pedal is actuated to make the DPTR signal indefinite, the reading out of said positional data from the memory locations is stopped to allow the last positional data read-out from each random memory to be superimposed with desired magnitudes adjusted by said control transmitter.

2. The system of claim 1 wherein the positional actual data delivered by said power member are cyclically read in a memory location, wherein each preceding data is erased, until the switching time selected by the DPTR signal is terminated resulting in loading the preceding memory location with data previously written-in and writing-in data in the next following memory location.

3. The system of claim 1 wherein the positional data from the memory defining desired magnitudes to actuate said power member are compared with actual data indicating the positions of the power member to define an error signal to control said servo device actuating said power member.

4. The system of claim 1 wherein a response curve of said servo device is loaded in a table memory which is loaded with a desired magnitude corresponding to a position magnitude read-out from said random memory to actuate said power member and from which a signal is read-out corresponding to said desired magnitude which is delivered from a microprocessor to said servo device.

5. The system of claim 4 wherein said positional data read-out from said random memory are superimposed with desired magnitudes which are adjustable at a control transmittor.

6. The system of claim 5 wherein a pedal is provided which when being actuated locks switching over the memory lo-cations in said memories and wherein said positional data read-out from the memory latest are superimposed with desired magnitudes adjusted by said control transmitter.

7. The system of claim 1 wherein said DPTR signal is superimposed with a limit signal to slow down the read-out speed of data from said memory when a hydraulic system receives less fluid volume than required.

8. The system of claim 7 wherein the limit signal is generated by the valve in its open position when the pump delivery volume is less than required.

9. The system of claim 7 wherein said limit signal is generated when the power of the pump drive means is less than required.

10. The system of claim 1 wherein the difference of the positional data defining desired magnitudes read-out from said memory and positional data generated by the power member defining actual magnitudes is generated and the positional data read-out from the memory are superimposed with the difference signal.

11. The system of claim 1 wherein said DPTR signal is used as a correcting variable signal for a closed loop control.

* * * * *